May 25, 1937.　　　R. E. B. SHARP　　　2,081,842

PIVOT VALVE AND SEALING MEANS

Filed Dec. 29, 1933　　　2 Sheets-Sheet 1

INVENTOR
R.E.B. Sharp
BY
Edward
ATTORNEY

May 25, 1937.  R. E. B. SHARP  2,081,842
PIVOT VALVE AND SEALING MEANS
Filed Dec. 29, 1933  2 Sheets-Sheet 2
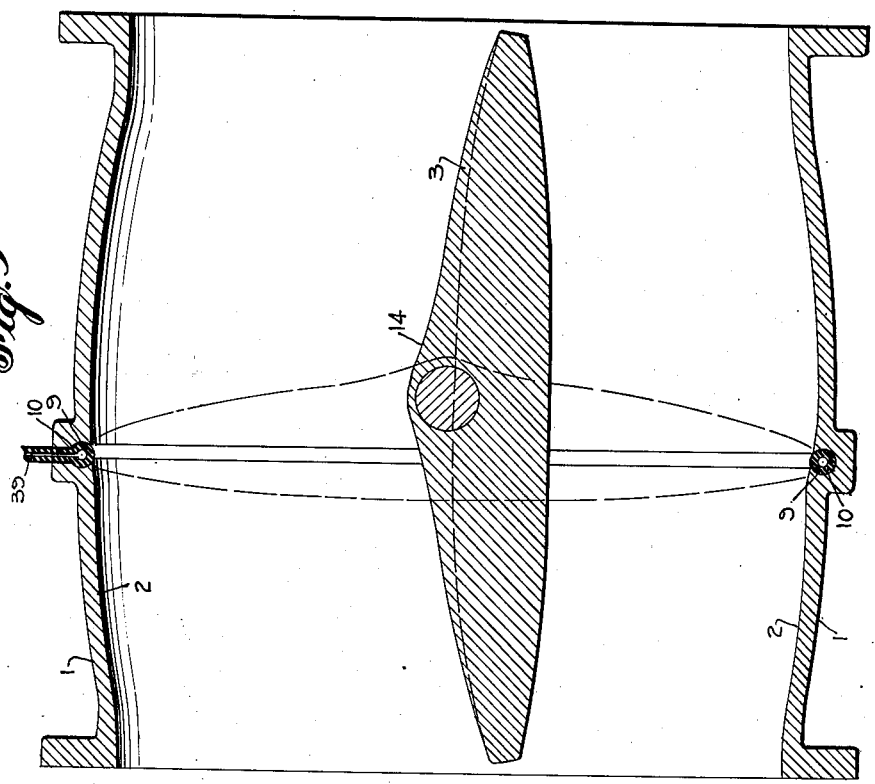
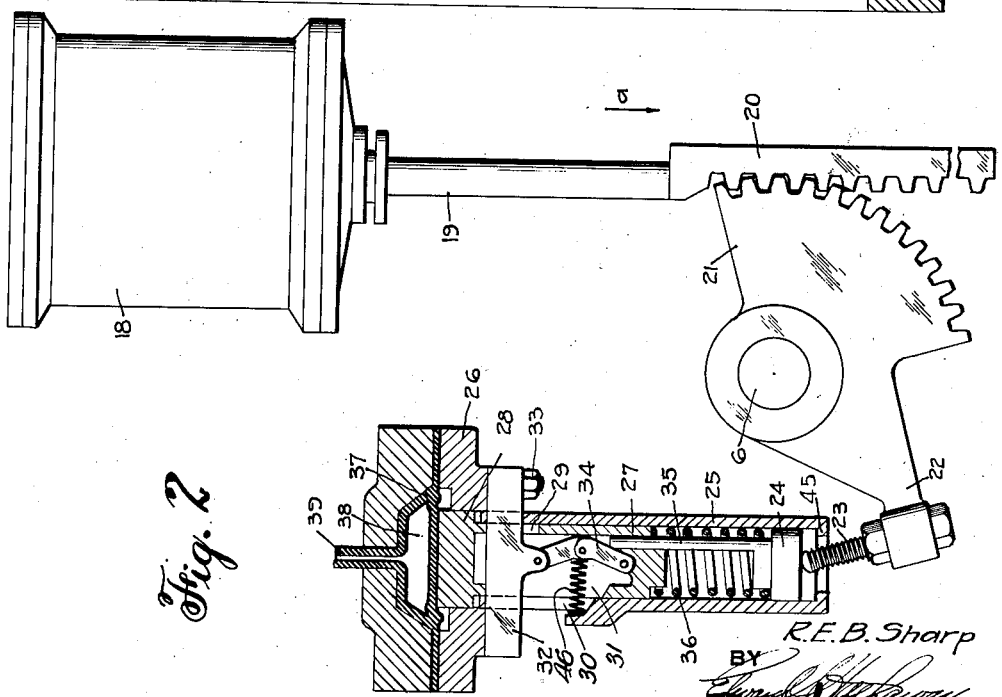

Patented May 25, 1937

2,081,842

UNITED STATES PATENT OFFICE 2,081,842

PIVOT VALVE AND SEALING MEANS

Robert E. Brunswick Sharp, Philadelphia, Pa., assignor to Baldwin-Southwark Corporation, a corporation of Delaware Application December 29, 1933, Serial No. 704,458

7 Claims. (Cl. 251—11)

This invention relates generally to valves of the pivotal disc type commonly known as butterfly valves and more particularly to improved means whereby the valve disc periphery may be continuously sealed without interruption by the pivot shafts.

The present invention is shown specifically in connection with a valve having pivot shafts offset from the disc periphery and provided preferably with an expansible and contractible fluid controlled tubular sealing element between the valve casing and disc periphery.

It is an object of my invention to provide improved means for controlling the sealing fluid pressure and more specifically to have this improved means coordinated in an improved manner with the operation of the valve operating servo-motor.

Other objects and advantages will be more apparent to those skilled in the art from the following description of the accompanying drawings in which:

Fig. 2 is a plan view of the valve operating mechanism shown near its full closed position and just about to apply the sealing pressure;

Fig. 3 is a section of Fig. 1 taken on line 3—3 thereof;

Figure 1:
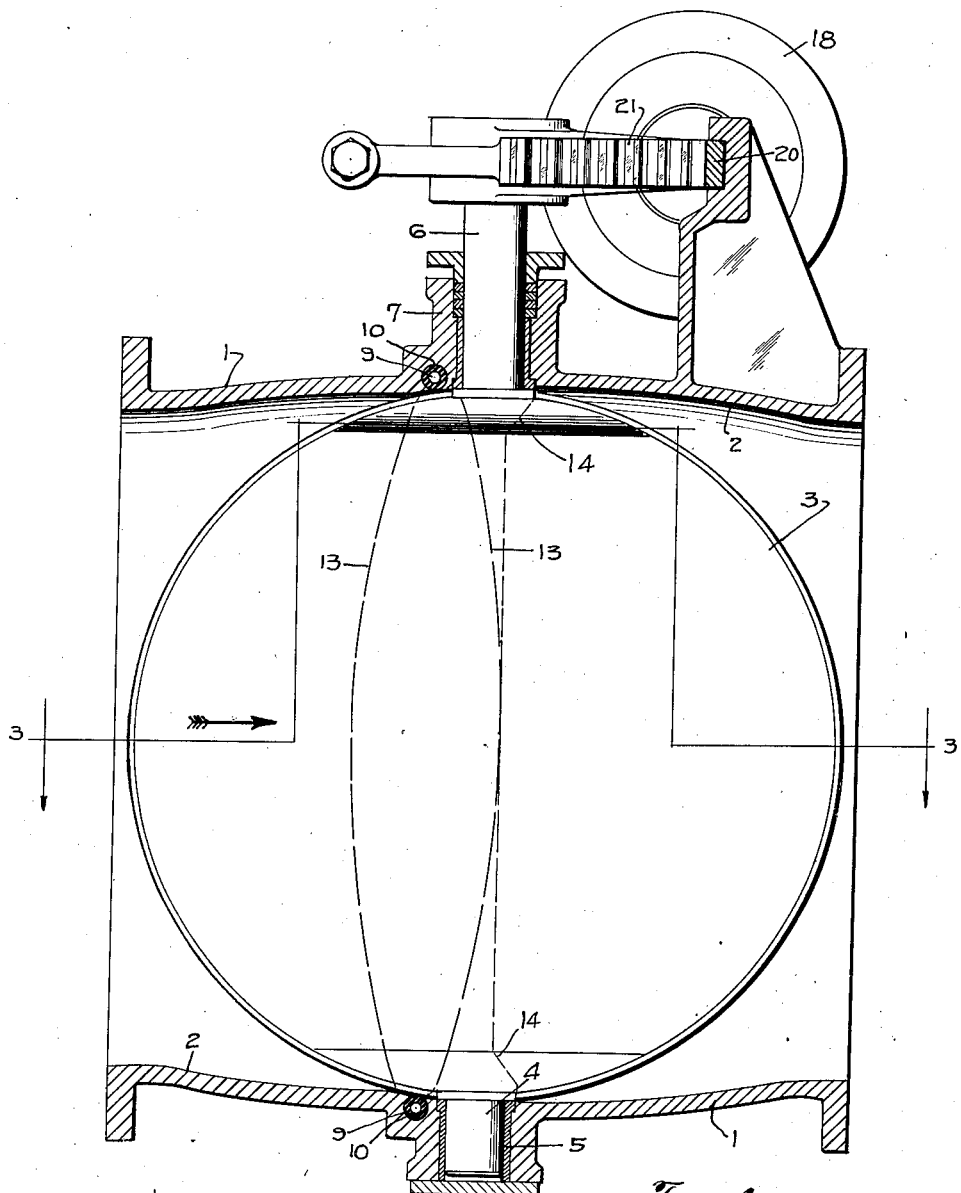
Fig. 1 is a vertical sectional view of a pivotal valve embodying my improvements.
Figure 4:
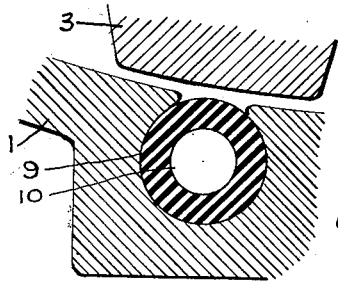
Fig. 4 is an enlarged fragmentary sectional view of the sealing element and disc periphery.

In the particular embodiment of the invention which is disclosed herein merely for the purpose of illustrating one specific form among possible others that the invention might take, I have provided a valve casing 1 of substantially circular cross-section having preferably a slightly longitudinally curved wall 2. A valve disc 3 has a pivot shaft 4 journalled in a suitable bearing 5 and an operating shaft 6 journalled in a suitably packed bearing 7. The shafts 4 and 6 have a common axis which is offset preferably on the downstream side of the valve disc when in its closed position, thereby presenting a continuous periphery 8 without interruption by the pivot shafts.

Interposed between the valve disc periphery and the casing 1 is a sealing element 9 preferably formed of tubular rubber and snugly disposed in a recess 10 formed in the valve body 1. This recess terminates in a relatively narrow slot in the wall of body 1 adjacent the closed position of the valve disc. This tubular member may be provided with a core to insure uniform expansion and contraction upon admission or discharge of fluid pressure through any suitable inlet, this fluid pressure being supplied from the upstream side of the pipe line or other suitable external source. Also the tubular member may be carried either in the valve disc periphery or in the valve casing as shown, but in either event the tubular or other suitably shaped sealing element may be expanded to provide a continuous seal around the disc periphery without any break adjacent the pivot shafts 4 and 6. Due to the sealing element extending past one side of the valve shafts 4 and 6 and very close thereto, the degree of offset of shafts 4 and 6 is not sufficient to make the valve difficult of manufacture or operation or to appreciably distort the fluid flow past the valve when in its open position as shown in Fig. 3. Also due to the relatively small extent of offset the wall 2, particularly in the region of the sealing element, may be formed as a portion of a sphere. Preferably the periphery of the disc is also formed as a sphere with a slightly less radius than that for surface 2. The centers of both spheres would be at the intersection of the center line of the shafts 4 and 6 with a plane passing through the center line of the valve body at right angles to the center line of said shafts.

The valve disc is preferably of lens shape having convex upstream and downstream faces 13, although the shafts 4 and 6 are connected preferably to the downstream face of the valve. To avoid an abrupt protuberance at the area where the shafts connect with the valve, the surrounding connecting area is tapered in the direction of fluid flow so as to present a streamlined surface generally indicated at 14.

To control the sealing pressure automatically in accordance with opening and closing movement of the valve, I have provided as shown in Fig. 2 improved means whereby the valve may be moved to substantially its full closed position whereupon fluid pressure is then automatically generated or supplied to the sealing tube, thereby avoiding the possibility of pinching the tube as the valve moves to its closed position. On the other hand, the sealing pressure control means is arranged so as to relieve the sealing pressure as the valve opens, although it is not as essential to completely release the pressure before initial opening movement takes place. To accomplish the foregoing mode of operation, I have shown a servo-motor 18 whose piston rod 19 has a rack 20 to actuate the valve shaft 6 through a gear segment 21. Fluid pressure may be admitted to either end of the servo-motor 18 and from any suitable source, thereby to open and close the valve. A stem 23 adjustably threaded in an arm 22 contacts the bottom of a plunger 24. This plunger is slidably guided in a cylinder 25 projecting from a diaphragm casing 26. A piston 27 is also slidably guided in cylinder 25 and has a head 28 at its inner end. The piston 27 has a pair of opposed slots 29 and 30 of different lengths communicating with a central hollow portion 31, thereby permitting a cross beam 32 to be inserted laterally through cylinder 25 and piston 27 and secured as by bolts 33 to the diaphragm casing 26. Toggle links 34 are pivotally connected at one end to member 32 and at the other end to piston 27. Plunger 24 has a finger 35 projecting through a suitable bore in piston 27 to beneath the toggle links 34 for the purpose of actuating the same in a manner to be described presently. A spring 36 is interposed between plunger 24 and piston 27. A diaphragm 37 is engaged by the head 28 so as to compress any suitable liquid in chamber 38 and thus supply the sealing tube with pressure through a pipe 39.

*Operation.*—Assuming the valve to be in open position and that it is desired to close the same, the servo-motor 18 is moved in the direction of arrow *a* to swing valve 3 to its closed position, it being understood that the sealing tube is in its retracted unsealing position. As the valve moves towards its closed position, segment 21 and arm 22 are rotated, thereby moving plunger 24 inwardly to compress spring 36. During this period piston 27 is held against movement due to toggle links 34 resting in immovable position against the right wall of piston 27. However, as plunger 24 continues to move to its final closing position, its finger 35 will likewise move inwardly to engage one side of toggle links 34 and force the same to the left side of their center line, whereupon their restraining action on piston 27 is broken, thus permitting spring 36 to suddenly push piston 27 and its head 28 inwardly against diaphragm 37 and thus compress liquid within diaphragm chamber 38. This sudden toggle release, with consequent building up of sealing pressure, occurs just about when the valve disc and operating mechanism reaches its closed position as shown in Fig. 2, thereby causing the sealing tube to be expanded into contact with the valve periphery with very little, if any, further movement of the valve disc. Hence there is no danger of pinching the tube during the closing movement of the valve disc. When the valve is opened, the servo-motor 18 is moved in the direction opposite to arrow *a*, thereupon moving arm 22 outwardly and hence releasing the pressure on spring 36. The sealing pressure in the tube and diaphragm 38 will move head 28 outwardly as the pressure on spring 36 is released. Due to this pressure being decreased gradually but simultaneously with opening movement of the valve disc, it is seen that no harmful effects will be produced as moisture between the tube and disc periphery will serve as a lubricant and in addition there cannot be any destructive pinching action on the tube even though the latter should be inflated to some extent as the disc moves away from the tube. As the plunger 24 moves outwardly, finger 35 will move therewith until finally toggle 34 may fall by gravity into its restraining position against the lower right wall ready to resist inward movement of piston 27 during the next closing movement of the valve. The toggle may fall to its position by gravity or this may be supplemented by any usual means, such as a spring 46, weight, etc. The cycle of operations is thereupon repeated for subsequent closing and opening movements of the valve. The spring 36 may be relatively strong, thus requiring a small movement to fully compress the same or it may be designed to require a longer movement to fully compress the same, these factors being a matter of design. Also a lip or flange 45 may serve as an outer stop for plunger 24.

From the foregoing disclosure it is seen that I have provided an extremely simple and yet highly effective means for producing a continuous seal around the entire periphery of the valve disc without interruption by the valve shafts while at the same time maintaining substantially unimpaired hydraulic flow in the pipe line when the valve is in its open position. This is accompanied by my improved means for controlling or creating sealing pressure.

It will of course be understood that various changes in details of construction and arrangement of parts may be made by those skilled in the art without departing from the spirit of the invention as set forth in the appended claims.

I claim:

1. A valve mechanism comprising, in combination, a casing, a movable valve element therein, fluid pressure controlled expansible means for sealing said casing and movable valve element, and means mechanically actuated by movement of said valve for generating the sealing pressure for said sealing means.

2. A valve mechanism comprising, in combination, a casing, a movable valve element therein, fluid pressure controlled means for sealing said casing and movable valve element, and means controlled by movement of said valve for effecting a reduction of the sealing pressure for said sealing means thereby to release the sealing action.

3. A valve mechanism comprising, in combination, a casing, a movable element therein, fluid pressure actuated expansible means for sealing said valve and casing, and means whereby movement of the valve automatically produces a pressure generating force for expanding said sealing means.

4. A valve mechanism comprising, in combination, a casing, a movable element therein, fluid pressure actuated expansible means for sealing said valve and casing, means whereby movement of the valve automatically produces a restrained pressure generating force adapted when released to expand said sealing means and means for releasing the restraint on said force automatically only when said valve is in substantially its closed position, thereby to effect sealing of the valve.

5. A valve mechanism comprising, in combination, a casing, a valve element therein having a periphery, means for moving said valve to open and closed positions, fluid pressure controlled means for sealing said periphery and casing, means for producing the sealing pressure for said sealing means including a releasably held plunger, means for imposing a force on said plunger automatically in accordance with movement of said valve, and means for releasing said plunger automatically when said valve is in substantially its closed position thereby to permit said force to move said plunger and cause fluid pressure to be supplied to said sealing means to effect a sealing action.

6. A valve mechanism comprising, in conbination, a casing, a movable valve element, fluid pressure controlled means for sealing said casing and valve element, means whereby said sealing means is in its unsealing position until said valve is moved substantially to its closed position, and means for thereupon effecting the sealing and thereafter maintaining the sealing means substantially in its sealing position during initial opening movement of the valve.

7. A valve mechanism comprising, in combination, a casing, a movable valve element therein, fluid pressure means for sealing said casing and valve element, and means whereby the sealing pressure is supplied to said sealing means automatically substantially when said valve element is in its closed position, and said means having provision whereby the sealing pressure is comparatively gradually reduced as the valve element is moved to its open position.

ROBERT E. BRUNSWICK SHARP.